United States Patent [19]

Nishimura et al.

[11] Patent Number: 4,833,632
[45] Date of Patent: May 23, 1989

[54] ELECTRONIC RECORD KEEPING DEVICE

[75] Inventors: Toshio Nishimura, Joyo; Megumi Fukusaki, Osaka, both of Japan

[73] Assignee: Sharp Kabushiki Kaisha, Osaka, Japan

[21] Appl. No.: 54,863

[22] Filed: May 27, 1987

[30] Foreign Application Priority Data

May 28, 1986 [JP] Japan .................................. 61-125206

[51] Int. Cl.⁴ ............................................. G06F 15/30
[52] U.S. Cl. ................................................ 364/709.04
[58] Field of Search ............... 364/709, 401, 408, 407, 364/406, 405, 706

[56] References Cited

U.S. PATENT DOCUMENTS

| 4,181,966 | 1/1980 | Wenninger et al. | 364/709 |
| 4,528,638 | 7/1985 | Hatta et al. | 364/709 |
| 4,737,911 | 4/1988 | Freeman, Jr. | 364/408 |

Primary Examiner—Gary V. Harkcom
Assistant Examiner—Long T. Nguyen
Attorney, Agent, or Firm—Birch, Stewart, Kolasch & Birch

[57] ABSTRACT

An electronic record keeping device for recording numerical data under different items. The device has a casing and a memory having a plurality of sections. The number of the sections corresponds to the number of items. Each section has a first memory area for storing a budget data and a second memory area for storing a cumulative expenditures. A key board provided on the casing has number keys for effecting the input of a numerical data, a plurality of item keys for effecting an access to a corresponding section in the memory upon depression of one item key, a mode key for changing the mode between a first mode for entering the budget data in the first memory area, and the second mode for entering the cumulative expenditure in the second memory area. A display is provided for displaying a numerical data inputted by the number keys, and a controller is provided to operate in response to a depression of one of the item keys such that, while the first mode is established, a numerical data as inputted by the number keys is entered and stored in the first memory area as the budget data, and that, while the second mode is established, a numerical data as inputted by the number keys is added to the cumulative expenditure previously stored in the second memory area in the second memory area.

2 Claims, 11 Drawing Sheets

Fig. 4a  ON  [C·CE]

| CALC |
| ---: |
| 0. |

Fig. 4b  [MODE]

| SET |
| ---: |
| 0. |

Fig. 4c  45000 [1]

| SET | |
| :--- | ---: |
| 1 | 45'000. |
| | BDGT |

Fig. 4d  850000 [2]

| SET | |
| :--- | ---: |
| | thou |
| 2 | 850. |
| | BDGT |

Fig. 5a
ON
[C·CE]

```
┌─────────────────┐
│      CALC       │
│              0. │
└─────────────────┘
```

Fig. 5b    35000  [2]

```
┌─────────────────┐
│      CALC       │
│   2      35'000.│
└─────────────────┘
```

Fig. 5c    24000  [1]

```
┌─────────────────┐
│      CALC       │
│   1      24'000.│
└─────────────────┘
```

Fig. 5d    47500  [2]

```
┌─────────────────┐
│      CALC       │
│   2      47'500.│
└─────────────────┘
```

Fig. 5e
S TTL
[=]

```
┌─────────────────┐
│      CALC       │
│        398'110. │
└─────────────────┘
```

Fig. 6a  [1]   
```
     CALC
 1
```

Fig. 6b  [RSLT]  
```
RSLT   CALC
 1     24'000
```

Fig. 6c  [2]  
```
RSLT   CALC
 2     215'700
```

Fig. 6d  [BAL]  
```
       CALC
 2     634'300
       BAL
```

Fig. 6e  [%]  
```
       CALC
 2      25.37
        PCT
```

Fig. 7a  [GTTL]

```
RSLT GTTL CALC
         898'110
```

Fig. 7b  [BAL]

```
     GTTL CALC
        1'126'890
         ___
         BAL
```

Fig. 7c  [%]

```
     GTTL CALC
           26.10
          ___
          PCT
```

Fig. 8a  [MODE]

```
           SET
          0.
```

Fig. 8b  [1] [RSLT]

```
RSLT       SET
   1    24'000
```

Fig. 8c  [C·CE]   | RSLT          SET |
                  |        -24'000.-  |

Fig. 8d  [C·CE]   | RSLT          SET |
                  |    1           0. |

Fig. 8e  [GTTL]   |    GTTL       SET |
                  |      12'500'000.  |
                  |       BDGT        |

Fig. 8f  [RSLT]   | RSLT GTTL     SET |
                  |        52'576'000.|

Fig. 8g  [C·CE]   | RSLT GTTL     SET |
                  |        52'576'000.|

Fig. 8h  [C·CE]   | RSLT GTTL     SET |
                  |                0. |

Fig. 8i  [1]      |               SET |
                  |    1       45'000 |
                  |           BDGT    |

Fig. 9a  [1]   | RSLT
                |  1    4'680.

Fig. 9b  [BAL] |  1    50'320.
                |      ‾‾‾‾‾
                |       BAL

Fig. 9c  [2]   |  2    262'000.
                |      ‾‾‾‾‾
                |       BAL

Fig. 10

RSLT  GTTL  CALC  SET                    thou
0'0'0'0'0'0'0'0 0 0
0. 0. 0. 0. 0. 0. 0. 0. 0. 0. E
└ITEM NO┘ BAL BDGT PCT

ELECTRONIC RECORD KEEPING DEVICE

CROSS REFERENCE TO THE RELATED APPLICATION

This application is related to a U.S. patent application Ser. No. 029,766 filed Mar. 24, 1987 and entitled "Electronic Account Recording Device", which is assigned to the same assignee as the present application.

BACKGROUND OF THE INVENTION

1. Field of the invention

The present invention relates to an electronic calculator and, more particularly, to a pocket size electronic record keeping device for keeping a record of a plurality of different items, whereby the summing in different classes such as the sales results of different items or the sales results by different salespersons or the expenditure results of different items can be easily calculated.

2. Description of the Prior Art

Conventionally, in order to obtain a sum of classified data, first, it is necessary to classify the data and then, the classified data are summed, requiring a time consuming task.

SUMMARY OF THE INVENTION

The present invention has been developed with a view to substantially solve the above described problem and has for its essential object to provide an improved electronic record keeping device which can easily provide a sum of classified data.

In accomplishing these and other objects, an electronic record keeping device according to the present invention comprises a casing and a memory having a plurality of sections. The number of the sections corresponds to the number of items to keep the record. Each section has a first memory area for storing a budget or sales quotas and a second memory area for storing a cumulative expenditures or sales results. A key board is provided on the casing and has number keys for effecting the input of a numerical data, a plurality of item keys for effecting access to a corresponding section in the memory upon depression of one item key, a mode key for changing the mode between a first mode for entering the budget data in the first memory area, and the second mode for entering the cumulative expenditure in the second memory area. A display is provided for displaying a numerical data inputted by the number keys, and a controller is provided to operate in response to a depression of one of the item keys such that, while the first mode is established, a numerical data as inputted by the number keys is entered and stored in the first memory area as the budget data, and that, while the second mode is established, a numerical data as inputted by the number keys is added to the cumulative expenditure previously stored in the second memory area in second memory area.

Further scope of applicability of the present invention will become apparent from the detailed description given hereinafter. However, it should be understood that the detailed description and specific examples, while indicating preferred embodiments of the invention, are given by way of illustrated only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with a preferred embodiment thereof with reference to the accompanying drawings, which are given by way of illustration only, and thus, are not limitative of the present invention and in which like parts are designated by like reference numerals throughout and in which:

FIGS. 4a, 4b, 4c, 4d are diagrammatic views showing operations for entering budgets or quotas;

FIGS. 5a, 5b, 5c, 5d, 5e are diagrammatic views showing operations for entering expenses or sales results;

FIGS. 6a, 6b, 6c, 6d, 6e are diagrammatic views showing operations for calling back expenses or sales results;

FIGS. 7a, 7b, 7c are diagrammatic views showing operations for calculating a grand total of expense, a grand total of balance and a grand total of percentage;

FIGS. 8a, 8b, 8c, 8e, 8f, 8g, 8h, 8i diagrammatic views showing operations for deleting the data stored in a memory portion 10b;

FIGS. 9a, 9b, 9c are diagrammatic views showing operations for changing the data to be showing through the display;

FIG. 10 is a top plan view showing a detail of the display portion of the electronic record keeping device;

DESCRIPTION OF THE PREFERRED EMBODIMENTS

Figure 1:
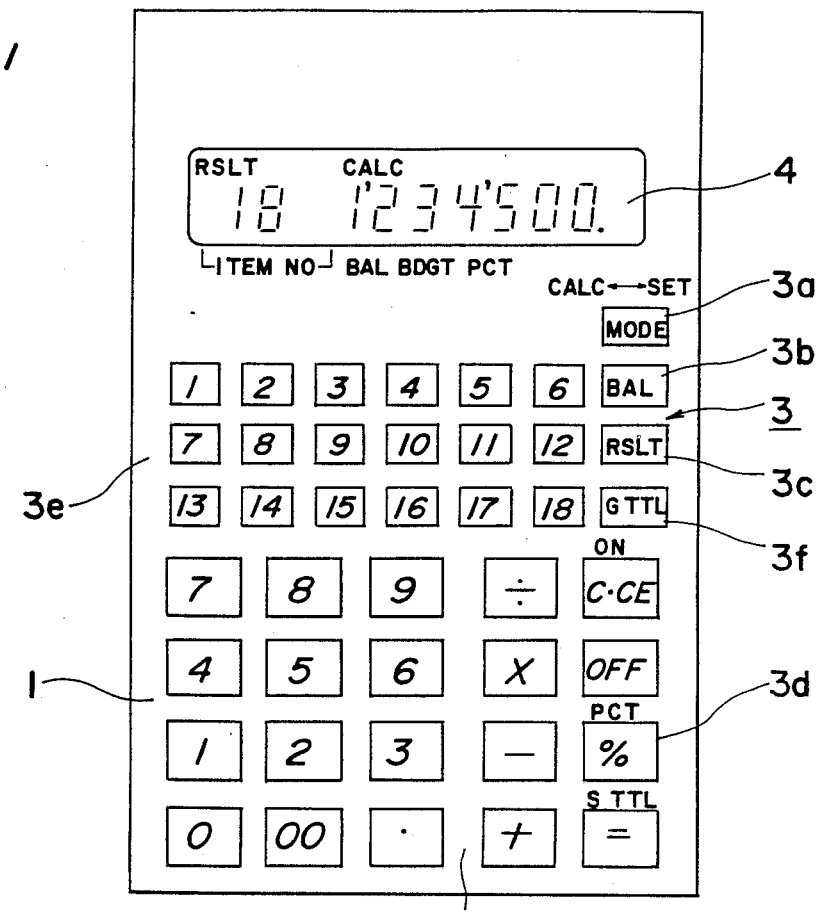
FIG. 1 is a plan view of an electronic record keeping device according to the present invention.

Referring to FIG. 1, a pocket size electronic record keeping device according to the present invention is shown. The electronic record keeping device has calculation functions of addition, subtraction, multiplication and division, as in an ordinary pocket size calculator, in addition to the classification and summing functions, according to the present invention.

For example, the record keeping device according to the present invention is used such that the budgets of different items are recorded and the expenditure results are also recorded in the corresponding items. By certain calculations, the balance and the percentage of the expenditure with respect to the budget can be displayed for each item or for the total of the items.

In another example, the record keeping device according to the present invention is used such that, instead of budgets, sales quotas for different salespersons or sales areas, or the like, are recorded, and instead of expenditures, sales results are recorded. Therefore, in description herein, the term "budget" can be replaced with "quotas" and the term "expenditure" can be replaced with "result".

The electronic record keeping device of the preferred embodiment is shown in FIG. 1 and is formed by a thin rectangular casing. The electronic record keeping device has a liquid crystal display 4 and keys for inputting data and for carrying out various functions, as will be described in detail below.

DISPLAY

As best shown in FIG. 10, display 4 can display ten digits in which the first two digits from the left are used for displaying the item number, and the remaining eight digits are used for displaying budget or expenditure, which will be described in detail later. In addition to the ten digits, the following indications can be displayed in display 4:

"RSLT" indicating that an amount, such as an expenditure, is being displayed;

"GTTL" indicating that a grand total is being displayed;

"CALC" indicating that a calculation mode is selected;

"SET" indicating that a set mode is selected;

"thou" indicating that the number being displayed is in the thousands;

"—" indicating that the number being displayed is negative; and

"E" indicating that an error has occurred.

Also shown in FIG. 10, the following symbols are provided below the display window:

"ITEM NO" indicating the number displayed at two digit places above represents the item number;

"BAL" indicating, when a bar is extended thereabove, that a balance is being calculated;

"BDGT" indicating, when a bar is extended thereabove, that the number displayed above is the budget; and "PCT" indicating, when a bar is extended thereabove, that the number displayed above represents the percentage.

The bar that extends above each symbol "BAL", "BDGT" or "PCT" is formed by a bottom segment in a seven-segment unit to display a number and a similar segment extending from the bottom segment.

KEYS

Referring to FIG. 1, the electronic record keeping device further has number keys 1 for inputting numbers, various calculation keys 2 for carrying out the calculation, and keys 3 for classifying the data and summing the classified data. Since the number keys 1 and calculation keys 2 are the same as those provided in the prior art calculator, the description is particularly directed to keys 3.

Keys 3 comprises "MODE" key 3a, "BAL" key 3b, "RSLT" key 3c, "PCT" key 3d, eighteen ("1"–"18") item keys 3e and "GTTL" key 3f, which will be described in detail below.

"MODE" key 3a is provided for selecting modes between calculation mode and set mode. When the calculation mode is selected, it is possible, as will be described later, to enter and call back amounts, such as expenditures, and to calculate balances and percentages, as well as to perform regular arithmetic calculations. Furthermore, when the calculation mode is selected, the indication "CALC" will appear in the display, such as shown in FIG. 4a.

When the set mode is selected, it is possible, as will be described later, to enter and call back budgets and also to delete budgets and expenditures. Furthermore, when the set mode is selected, the indication "SET" will appear in the display, such as shown in FIG. 4b.

"BAL" key 3b is a balance key, and is provided for calculating a difference between a budget and an expenditure in each item, or a difference between a sum of budgets and a sum of expenditures of all the items. When "BAL" key 3b is depressed, a bar will appear over the indication "BAL", such as shown in FIG. 6d.

"RSLT" key 3c is a result key, and is provided for calculating a cumulative expenditure of each item or of a sum of all the items. When "RSLT" key 3c is depressed, the indication "RSLT" will appear in the display, such as shown in FIG. 6b.

"PCT" key 3d is a percentage key, and is provided for calculating a percentage of the cumulative expenditure with respect to the budget, or any other percentages. For example, when it is assumed that the budget of an item is Bn and the cumulative expenditure of the item is An, a balance Z therebetween is:

$$Z = Bn - An$$

and the percentage S of the cumulative expenditure An with respect to the budget Bn is:

$$S = An/Bn \times 100.$$

Item keys 3e are provided for selecting one item from eighteen different items "1"–"18". When one item key 3e is depressed, the item number of the depressed key is displayed at two left digits in the display.

The display of the item number may accompany the display of "RSLT" when the cumulative expenditure An in that item is shown, or accompany the display of "BAL" when the balance Z in that item is shown, or accompany the display of "PCT" when the percentage S in that item is shown.

When an expenditure for one item is entered, the entered amount or the calculate amount will be stored, as a result of expenditure or as a result of sale, in a storing area for that item.

The above description of the item key is directed to a case when the calculation mode is established, but if the set mode is established, an amount entered through number key 1 is displayed and, by the depression of one item key, the displayed amount will be stored as a budget or quota for the item corresponding to the depressed item key. Therefore, the item key is used not only for entering expenditures or sales results, but also for entering budgets or quotas.

"GTTL" key 3f is a grand total key, and is provided for calculating the total of the budgets of all the items (referred as a grand total of the budgets), the total of the expenditures of all the items (referred to as a grand total of the expenditures), and the balance or the percentage of the grand total of the expenditures with respect to the grand total of the budgets. The grand total D1 of the expenditures can be given as:

$$D1 = \sum_{n=1}^{18} An,$$

and the grand total D2 of the budgets can be given as:

$$D2 = \sum_{n=1}^{18} Bn.$$

Thus, the balance T of the grand total expenditure can be given as:

$T = D2 - D1$, and the percentage P of the grand total expenditure can be given as:

$P = D1/D2 \times 100$.

It is to be noted that when the grand total is being calculated, no data can be entered even after a number is displayed.

STRUCTURE

Figure 2:
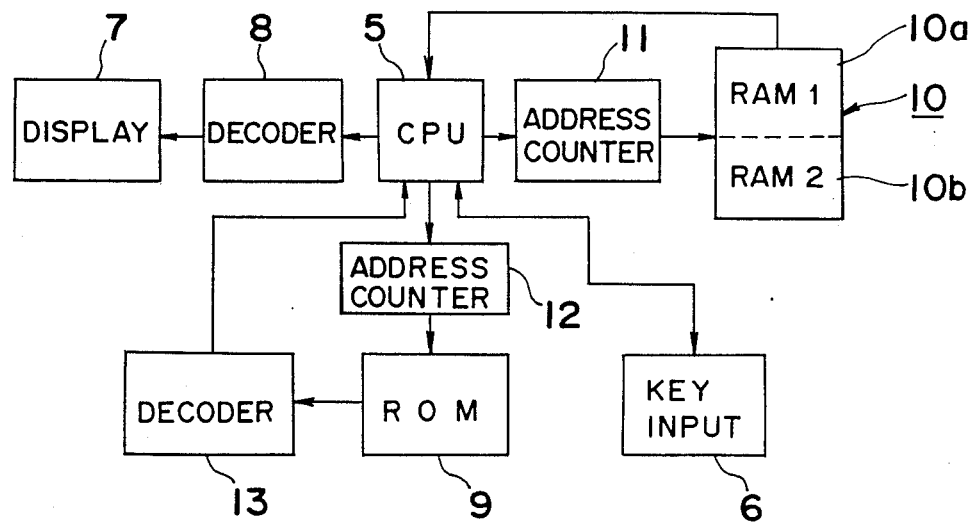
FIG. 2 is a block diagram of an electronic record keeping device of the present invention.

Referring to FIG. 2, a block diagram of the record keeping device of the present invention is shown. In the drawing, a reference number 5 is a CPU (central processing unit) for carrying out calculations and other controls, 6 is a key input portion corresponding to the keys shown in FIG. 1, 7 is display portion corresponding to display 4 shown in FIG. 1, and 8 is a decoder. Furthermore, a reference number 9 is a ROM (read only memory) for storing programs for carrying out the calculations, 10 is a RAM (random access memory) comprising a memory portion 10a for storing calculation data, such as registers, and a memory portion 10b for storing input data, such as budgets and expenditures.

RAM 10 is addressed by an address counter 11 and ROM 9 is addressed by an address counter 12. The output of ROM 9 is transmitted through an instruction decoder 13 to CPU 5.

Figure 3:
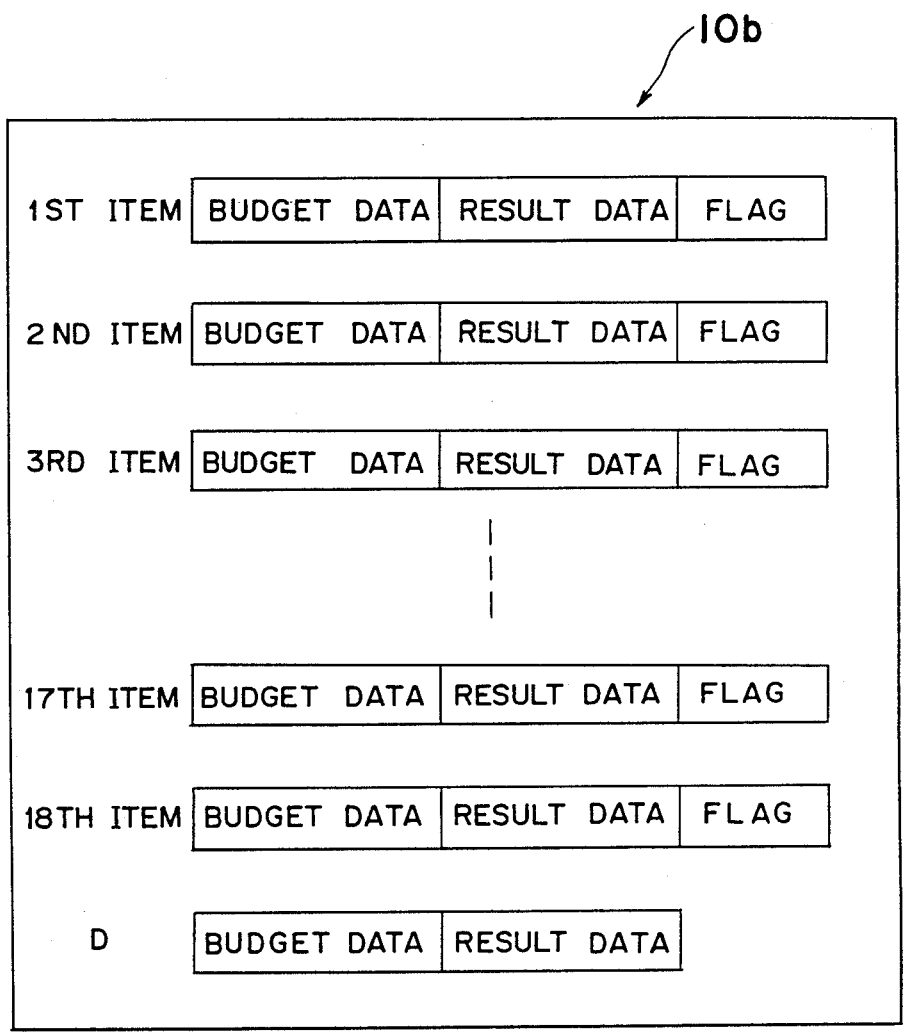
FIG. 3 is a schematic view showing a format for storing data.

Referring to FIG. 3, a memory map of memory portion 10b of RAM 10 is shown. The memory area has eighteen sections, each section defined by a register. Each section is divided into a budget-data storing area for storing a budget or a quota, a result-data storing area for storing a cumulative expense or a cumulative sales result, and flag-data storing area, which areas are fixed. The flag is used, when it is set, for indicating that the amount stored in the budget-data storing area is in the thousands.

The memory area of FIG. 3 further has a register D for storing the grand total of the budget and the grand total of the expenditures.

OPERATIONS

(1) Entering Budgets

Referring to FIGS. 4a–4d, operations for entering budgets or quotas are explained.

When the device is turned on (FIG. 4a), the calculation mode is automatically established. Thus, by using the "MODE" key 3a, the mode is changed to set mode (FIG. 4b) so that SET is indicated in the display. Then, by using number keys 1, a budget, such as 45000 is entered and, thereafter, one of the item keys, such as "1" is depressed. Thus, the budget amount "45000" and the selected item "1" are displayed, and a bar appears over the symbol "BDGT" (FIG. 4c). In this case, "45000" is stored in the budget-data storing area in the memory section of the item 1.

In the case where the input budget has six or more digits, all numbers from the hundreds place down will be rounded down and the whole number will be displayed in thousands together with an indication of "thou". For example, as shown in FIG. 4d, when the input budget for item 2 is "850000", the display shows "850" with a superscript of "thou". In this case, "850" is stored in the budget-data storing area in the memory section of the item 2, and the flag for item 2 is set indicating that the stored budget is in the thousands.

When the budget data stored in thousands is used, for example, for obtaining a balance, the calculation is carried out with a whole number having digits as low as ones.

According to the present invention, it is possible to round the numbers from a difference place, such as from the thousands place down. In this case, the whole number will be displayed and stored in ten thousands.

(2) Entering Expenses

Referring to FIGS. 5a–5e, operations for entering expenses or sales results are explained.

When the device is turned on (FIG. 5a), the calculation mode is automatically established. Then, as shown in FIG. 5b, under the calculation mode, an amount of the expenditure, such as "35000" is inputted by the use of number keys 1 and, thereafter, one of the item keys, such as item key "2" is depressed. When the item key "2" is depressed, the amount "35000" is added to the contents of the result-data storing area in the memory section of the item 2, and the added result is stored in that result-data storing area. In a similar manner, expenses are entered (FIGS. 5c and 5d). After entering a number of expenses for a number of items, an "=" key, indicated as "STTL" meaning subtotal, is depressed to calculate a total of the expenses which has been entered.

(3) Calling Back Expenses

Referring to FIGS. 6a–6e, operations for calling back expenses or sales results are explained.

After the device is turned on, one item key, such as "1", and "RSLT" key 3c are depressed sequentially in said order or in the opposite order (FIGS. 6a and 6b). Thereupon, a sum of the expenses so far entered in the designated item is displayed, as shown in FIG. 6b, together with the indication "RSLT". Such a sum is referred to as a cumulative expense. Thereafter, as long as the indication "RSLT" is displayed under the calculation mode, a depression of one item key will automatically display a cumulative expense of the item corresponding to the depressed item key, such as shown in FIG. 6c.

When "BAL" key 3b is depressed while displaying the cumulative expense of one item, a balance of the cumulative expense with respect to the budget of the item will be displayed, such as shown in FIG. 6d. Similarly, when "%" key 3d is depressed while displaying the cumulative expense of one item, a percentage of the cumulative expense with respect to the budget of the item will be displayed, such as shown in FIG. 6e.

Also, when another item key is depressed while displaying a balance, or a percentage, of the cumulative expense of one item, a balance or a percentage of the cumulative expense of the depressed another item will be displayed.

(4) Calculating Grand totals

Referring to FIGS. 7a–7c, operations for calculating a grand total of expense, a grand total of balance and a grand total of percentage are explained.

Under the calculation mode, when "RSLT" key 3c and "GTTL" key 3f are depressed sequentially in said order or in the opposite order, a grand total of the cumulative expenses of all the items will be displayed, as shown in FIG. 7a.

Similarly, under the calculation mode, when "BAL" key 3b and "GTTL" key 3f are depressed, a grand total of the balance will be displayed (FIG. 7b), and when "%" key 3d and "GTTL" key 3f are depressed, a grand total of the percentage will be displayed (FIG. 77c).

It is to be noted that, from the condition shown in FIG. 7a, the grand total of balance can be obtained by merely depressing the "BAL" key, because the "GTTL" key is already depressed in the previous step. Similarly, either from the condition shown in FIG. 7a or 7b, the grand total of percentage can be obtained by merely depressing the "%" key.

(5) Deleting Stored Data

Referring to FIGS. 8a-8i, operations for deleting the data stored in memory portion 10b will be described.

To delete data stored in memory portion 10b, the set mode is established by the depression of "MODE" key, as shown in FIG. 8a.

In order to delete the cumulated expense data in a certain item, the item key, such as "1" is depressed so as to open the designated item and, thereafter, the "RSLT" key is depressed to display the cumulated expense, as shown in FIG. 8b Then, a clear key "C.CE" is depressed, resulting in the flashing of the display, as shown in FIG. 8c. Then, when the clear key "C.CE" is depressed again for the second time, the cumulated expense data as stored in the result-data storing area in the memory section of the item 1 is cleared, as well as the display indication, as shown in FIG. 8d.

In order to delete the cumulated expense data in all the items, instead of depressing the item key, the "GTTL" key is depressed (FIG. 8e). Other operations are the same as that described above. That is, the "RSLT" key is depressed (FIG. 8f), and then the clear key "C.CE" is depressed twice successively (FIGS. 8g and 8h).

The budget data in a certain item or in all items is deleted in a similar manner as described above. The difference is, instead of depressing the "RSLT" key in the step shown in FIG. 8b or 8f, the "BDGT" key is depressed, such as shown in FIG. 8i.

As is apparent from the foregoing description and the description which will be given later in connection with FIG. 11a, the last depressed key, among "RSLT", "BAL" and "%" keys, remains effective. Also, the last depressed key, among item keys "1"-"18" and "GTTL" key, remains effective. For example, as shown in FIG. 9a, assume that the device is now in a condition showing the indication "RSLT" and the cumulative expenditure "4,680" of item "1", the depression of the "BAL" key will result in a condition shown in FIG. 9b in which the balance of item "1" is displayed. In this case, the selection of item "1" as effected by the depression of the item key "1" remained effective. Similarly, from the condition of FIG. 9b, if the item key "2" is depressed, the balance of the item "2" will be displayed, as shown in FIG. 9c.

(6) Thorough Operation

Figure 11A:
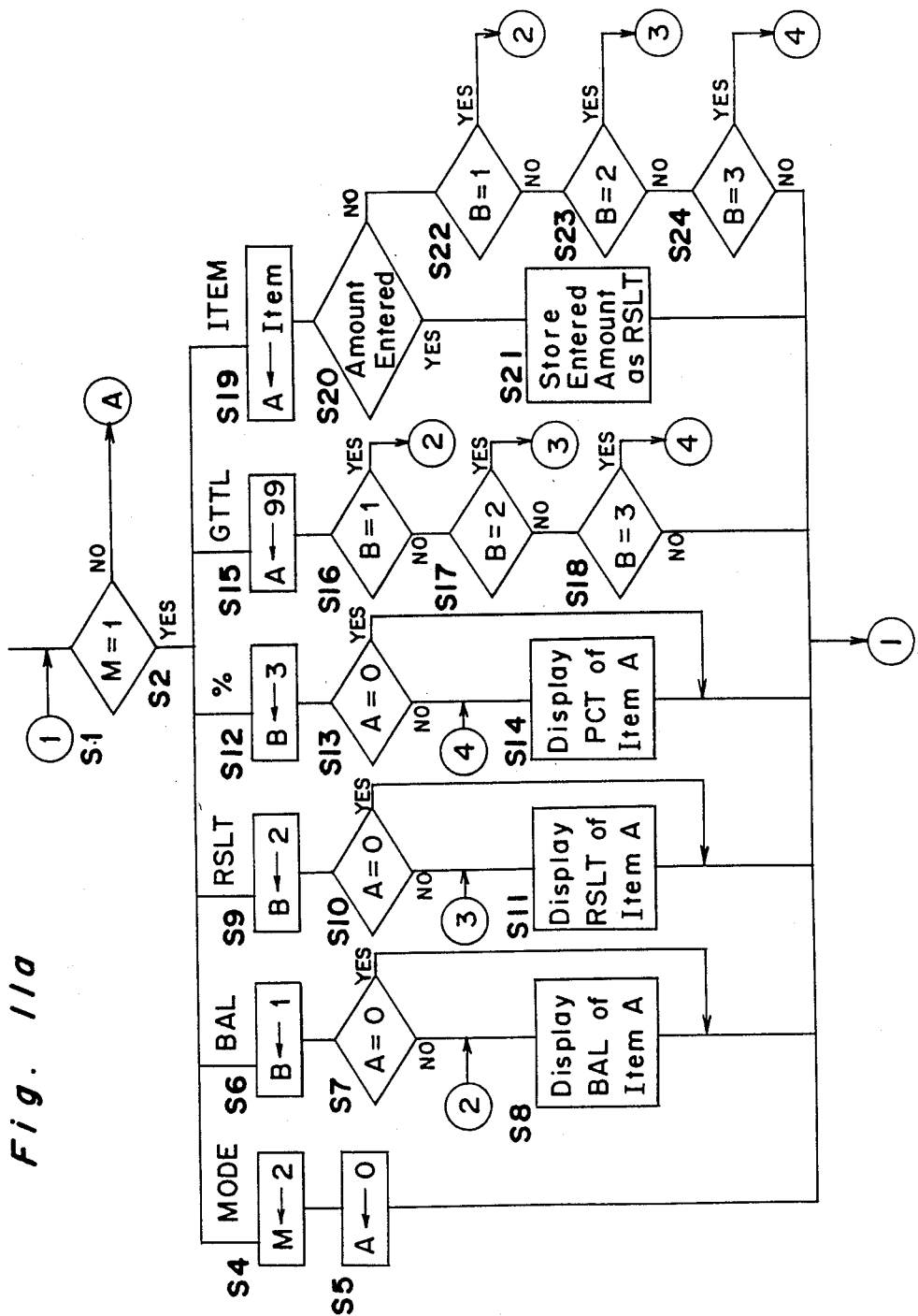
FIGS. 11a and 11b show a flow chart of various operations carried out by the electronic record keeping device of the present invention.
Figure 11B:
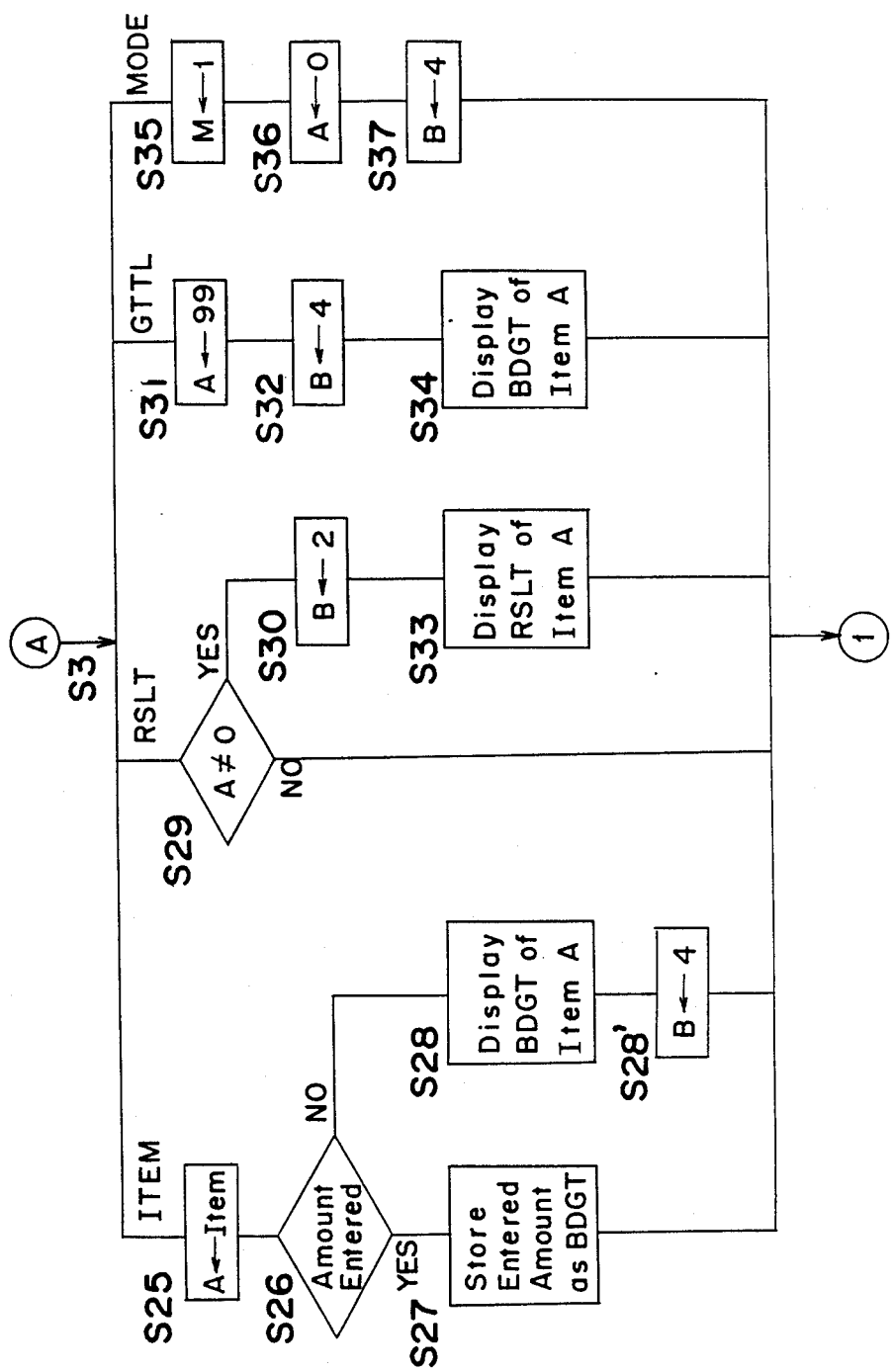

Referring to FIGS. 11a and 11b a flow chart is illustrated showing a thorough operation of the record keeping device according to the present invention is shown.

At step S1, it is detected whether or not a variable M is carrying "1". If variable M is carrying "1", it is indicated that the calculation mode is selected, and then, it is waited (step S2 in FIG. 11a) until any one of the keys "MODE", "BAL", "RSLT", "%", "GTTL" and "1"-"18" of item keys is depressed. On the contrary, if variable M is carrying "2", it is indicated that the set mode is selected, and then, it is waited (step S3 in FIG. 11b) until any one the keys "1"-"18" of item keys, "RSLT", "GTTL" and "MODE" is depressed. Here, it is assumed that, at first, variable M is carrying "1".

Then, if the "MODE" key is depressed (step S4), "1" carried in variable M is changed to "2" indicating the set mode, and a variable A for carrying an item number data is reset to "0" indicating that no item number is entered. Thereafter, the program returns to step S1 and further to step S3 (FIG. 11b).

At step S2, if the "BAL" key is depressed, a variable B carries "1" to indicate the depression of the "BAL" key (step S6). Then, at step S7, it is detected whether or not variable A is carrying "0". If variable A is carrying "0", the program goes to step S1. On the contrary, if variable A is carrying a number, such as "3", the program goes to step S8 to display the balance amount in the identified item, e.g., item 3. Then, the program returns to step S1.

At step S2, if the "RSLT" key is depressed, variable B carries "2" to indicate the depression of the "RSLT" key (step S9). Then, at step S10, it is detected whether or not variable A is carrying "0". If variable A is carrying "0", the program goes to step S1. On the contrary, if variable A is carrying a number, such as "5", the program goes to step S11 to display the result amount, such as a cumulative expenditure in the identified item, e.g., item 5. Then, the program returns to step S1.

At step S2, if the "%" key is depressed, variable B carries "3" to indicate the depression of the "%" key (step S12). Then, at step S13, it is detected whether or not variable A is carrying "0". If yes, the program goes to step S1, but if no, the program goes to step S14 at which the percentage of the cumulative expenditure with respect to the budget is displayed for the item identified by variable A. Then, the program returns to step S1.

At step S2, if the "GTTL" key is depressed, variable A carries a number (step S15), such as "99", which is not used to indicate the item number, so as to indicate the grand total of the items. Then, at steps S16, S17 and S18, it is detected whether or not variable B is carrying any one of "1", "2" and "3". If it is detected that variable B is carrying "1", the program goes to step S8 to display the grand total of the balance amounts in all the items. If it is detected that variable B is carrying "2", the program goes to step S11 to display the grand total of the cumulative expenditures in all the items. And, if it is detected that variable B is carrying "3", the program goes to step S14 to display the percentage of the grand total of the cumulative expenditures with respect to the sum of the budgets in all the items.

At step S2, if any one of the eighteen ("1"-"18") item keys is depressed, variable A carries a number corresponding to the depressed item key (step S19). Then, it is detected at step S20 whether or not an amount is being entered, such as by using number keys 1. If yes, the entered amount is added to the cumulative expenditure and the sum thereof is stored as a new cumulative expenditure for the designated item. If no amount is being entered, it is detected at steps S22, S23 and S24 whether or not variable B is carrying any one of "1", "2" and "3" so as to display either one of balance, cumulative expenditure or percentage of the designated item.

As understood from the flow chart of FIG. 11a, once the item number is designated, the balance, the cumulative expenditure or the percentage of the designated item will be calculated and displayed by merely depressing the "BAL", "RSLT" or "%" key. Also, once the "BAL", "RSLT" or "%" key is depressed, the balance, the cumulative expenditure or the percentage of different items will be calculated and displayed upon depression of the item key.

Referring to FIG. 11b, when the set mode is established, it is waited at step S3 which one of the key will be depressed.

At step S3, if any one of the eighteen ("1"–"18") item keys is depressed, variable A carries a number corresponding to the depressed item key (step S25). Then, it is detected at step S26 whether or not an amount is being entered, such as by using number keys 1. If yes, the entered amount is stored as a budget for the designated item. If no amount is being entered, the program goes to step S28 for displaying the budget previously stored for the designated item. Then, at step S28', variable B carries "4" indicating that budget is to be displayed. Then, the program returns to step S1.

At step S3, if the "RSLT" key is depressed, it is detected at step S29 whether $A \neq 0$, or not. If variable A is carrying "0", the program returns to step S1. On the contrary, if variable A is carrying a number other than "0" for designating a particular item, the program goes to step S30 at which variable B carries "2" indicating that the "RSLT" key is depressed. Then, at step S33, the cumulative expenditure of the designated item is displayed.

At step S31, if the "GTTL" key is depressed, the variable A is stored with a number "99" for the indication of the grand total (step S31), and the variable B is stored with a number "4" (step S32). Then, the grand total of the budget is displayed (step S34).

At step S35, if the "MODE" key is depressed, the variable M is stored with a number "2" for the indication of the calculation mode. Thereafter, variable A is stored with "0" and variable B is stored with "4" (steps S36 and S37).

Figure 12:
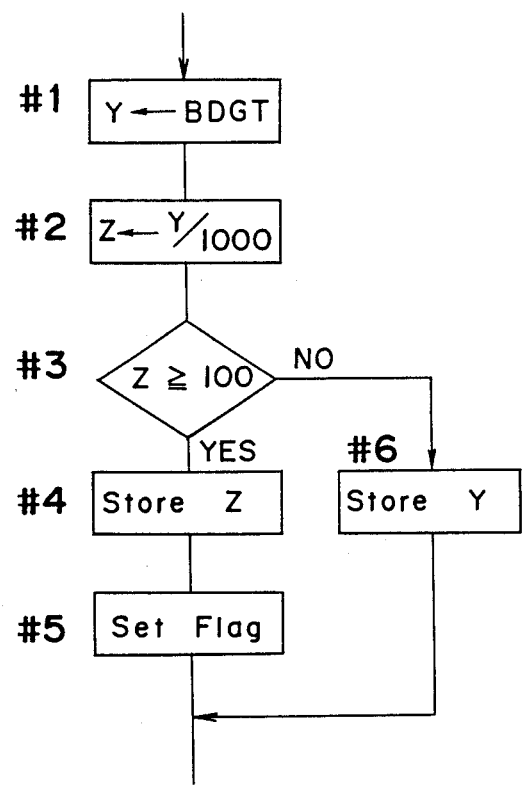
FIG. 12 is a flow chart of an operation for rounding a budget amount.

Referring to FIG. 12, a flow chart for rounding a budget is shown. At step #1, an entered budget amount is stored in a register Y, and at step #2, one thousandth of the entered budget amount is stored in a register Z. At step #3, it is detected whether or not the contents of register Z is greater than 100. If it is greater than 100, the contents stored in register Z is stored in RAM 10b (step #4), and a flag indicating the thousands is set (step #5). On the contrary, if the contents of register Z is not greater than 100, the contents stored in register Y is stored in RAM (step #6).

As has been described above, the electronic record keeping device according to the present invention has the following features.

(a) A memory is divided into a plurality of sections for storing data of a plurality of items. Each section is divided into a budget-data storing area for storing a budget, a result-data storing area for storing a cumulative expense, and a flag-data storing area for storing a flag for indicating that the amount stored in the budget-data storing area is in the thousands. Using these data, a percentage or a balance is calculated. When one calculation, such as a percentage calculation is carried out for one item, the depression of another item key will effect the same calculation, i.e., the percentage calculation for another item.

(b) Item keys are provided individually for different items so that the data in the memory sections can be easily accessed by merely depressing one item key.

(c) In the case where the input budget has digits greater than a predetermined number of digits, all numbers from a certain digit place down will be rounded down and the whole number will be displayed in less number of digits with an indication of the rounding.

According to the electronic record keeping device of the present invention, since storing sections and the keys to have an access to such sections are provided individually for the classified items, it is not necessary to provide any class searching or class scrolling function to have an access to a desired class, all it is necessary is to merely depress an item key of the requested class. Therefore, the data processing procedures can be expedited. Since the budget can be set for each item, the percentage or the balance can be easily obtained.

Also, since the item keys are provided individually for different items, the data in each item can be easily accessed by depressing the item key of the requested item.

Furthermore, since one calculation, such as a percentage calculation or a balance calculation, effected for one item can be carried out for the next item upon depression of another item key, the same data, such as balance data for different items can be obtained easily.

Moreover, since the budgets greater than a certain amount are rounded off and stored with less digits, great numbers may be stored in a small memory area.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. An electronic record keeping device for recording numerical data under different items, comprising: a casing;

memory means having a plurality of sections, a number of sections corresponding to a number of items, each section having a first memory area for storing a first numerical data and a second memory area for storing a second numerical data;

a key board on said casing having:

number keys for effecting the input of a numerical data, a plurality of item keys for effecting an access to a corresponding section in said memory means upon depression of one item key, a mode key for changing between a first mode for entering the first numerical data in said first memory area, and a second mode for entering the second numerical data in said second memory area, a balance key for obtaining a difference between said first and second numerical data of an item when said balance key and item are depressed, and wherein a depressed effect of said balance key being maintained after different item keys are depressed;

display means for displaying at least a numerical data inputted by said number keys; and control means, operated in response to depression of one said item keys such that, while said first mode is established, a numerical data as inputted by said number keys is entered and stored in said first memory area as the first numerical data, and that, while said second mode is established, a numerical data as inputted by said number keys is added to a second numerical data previously stored in said second memory area and the added result is stored as a cumulated second numerical data in said second memory area.

2. An electronic record keeping device for recording numerical data under different items, comprising:
- a casing;
- memory means having a plurality of sections, a number of sections corresponding to a number of items, each section having a first memory area for storing a first numerical data and second memory area for storing a second numerical data;
- a key board on said casing having:
- number keys for effecting the input of a numerical data,
- a plurality of item keys for effecting an access to a corresponding section in said memory means upon depression of one item key,
- a mode key for changing between a first mode for entering the first numerical data in said first memory area, and a second mode for entering the second numerical data in said second memory area,
- a percentage key for obtaining a percentage of said second numerical data with respect to said first numerical data of an item when said percentage key and item key are depressed, a depressed effect of said percentage key being
- maintained after different item keys are depressed;
- display means for displaying at least a numerical data inputted by said number keys; and
- control means, operated in response to a depression of one of said item keys such that, while said first mode is established, a numerical data as inputted by said number keys is entered and stored in said first memory area as the first numerical data, and that, while said second mode is established, a numerical data as inputted by said number keys is added to a second numerical data previously stored in said second memory area and the added result is stored as a cumulated second numerical data in said second memory area.

* * * * *